(12) United States Patent
Zhong

(10) Patent No.: US 10,069,131 B2
(45) Date of Patent: Sep. 4, 2018

(54) ELECTRODE FOR ENERGY STORAGE DEVICES AND METHOD OF MAKING SAME

(71) Applicant: Linda Zhong, Oakland, CA (US)

(72) Inventor: Linda Zhong, Oakland, CA (US)

( * ) Notice: Subject to any disclaimer, the term of this patent is extended or adjusted under 35 U.S.C. 154(b) by 378 days.

(21) Appl. No.: 13/780,365

(22) Filed: Feb. 28, 2013

(65) Prior Publication Data

US 2013/0255872 A1    Oct. 3, 2013

Related U.S. Application Data

(60) Provisional application No. 61/618,082, filed on Mar. 30, 2012.

(51) Int. Cl.
| | |
|---|---|
| *H01M 4/04* | (2006.01) |
| *H01G 13/00* | (2013.01) |
| *H01G 11/86* | (2013.01) |
| *H01G 11/28* | (2013.01) |
| *H01G 11/38* | (2013.01) |

(Continued)

(52) U.S. Cl.
CPC .............. *H01M 4/04* (2013.01); *H01G 11/28* (2013.01); *H01G 11/38* (2013.01); *H01G 11/86* (2013.01); *H01G 13/00* (2013.01); *H01M 4/02* (2013.01); *H01M 4/043* (2013.01); *H01M 4/0404* (2013.01); *H01M 4/88* (2013.01); *H01G 11/34* (2013.01); *H01M 4/13* (2013.01); *Y02E 60/13* (2013.01)

(58) Field of Classification Search
CPC ........ B29C 41/08; H01G 11/38; H01G 11/42; H01G 13/00; H01M 4/0404; H01M 4/0416; H01M 4/04; H01M 4/043

USPC ................................. 156/62.2, 242; 361/502
See application file for complete search history.

(56) References Cited

U.S. PATENT DOCUMENTS 6,086,790 A * 7/2000 Hayashi ................... H01B 1/22
106/1.05
7,492,571 B2 * 2/2009 Zhong et al. ................. 361/502
(Continued)

FOREIGN PATENT DOCUMENTS

| CN | 102324317 A | 1/2012 |
|---|---|---|
| EP | 1923895 | 5/2008 |

OTHER PUBLICATIONS

Extended European Search Report for Application No. 13767354.7 dated Nov. 18, 2015 (11 pages).

*Primary Examiner* — Philip Tucker
*Assistant Examiner* — John Blades
(74) *Attorney, Agent, or Firm* — Procopio, Cory, Hargreaves & Savitch; Noel Gillespie; Francis Plati

(57) ABSTRACT

The present invention is directed to an electrode for energy storage devices and a method for making the electrode for energy storage devices is disclosed, where a flexible binder in the electrode formulation is activated by certain additives and is uniformly deposited on to the active and conductive particles by high speed mixing. The particles deposited with activated binder particles are then pressed together to form free standing electrode film. High performance and cost effective products, such as free standing electrode films, laminated electrodes, ultracapacitors, lithium ion capacitors, batteries, fuel cells and hybrid cells which are the combination of the above devices, and the energy storage system or the system blocks, such as modules, can be manufactured using this process.

11 Claims, 8 Drawing Sheets

(51) Int. Cl.
*H01M 4/02* (2006.01)
*H01M 4/88* (2006.01)
H01G 11/34 (2013.01)
H01M 4/13 (2010.01)

(56) References Cited

U.S. PATENT DOCUMENTS

| | | |
|---|---|---|
| 7,791,860 B2* | 9/2010 | Mitchell et al. .............. 361/502 |
| 7,935,155 B2* | 5/2011 | Mitchell ................ H01G 11/28 |
| | | 156/306.3 |
| 8,213,156 B2* | 7/2012 | Mitchell et al. .............. 361/502 |
| 2004/0164440 A1 | 8/2004 | Ozaki et al. |
| 2008/0201925 A1 | 8/2008 | Zhong et al. |
| 2009/0223630 A1* | 9/2009 | Mitchell et al. .............. 156/320 |
| 2009/0290288 A1* | 11/2009 | Mitchell et al. .............. 361/502 |
| 2009/0294081 A1 | 12/2009 | Gadkaree et al. |
| 2010/0014215 A1* | 1/2010 | Zhong ................... H01G 9/058 |
| | | 361/502 |
| 2011/0287305 A1* | 11/2011 | Scordilis-Kelley .......................... |
| | | H01M 2/1653 |
| | | 429/163 |

* cited by examiner

ELECTRODE FOR ENERGY STORAGE DEVICES AND METHOD OF MAKING SAME

FIELD OF THE INVENTION

The present invention is directed to an electrode for an energy storage device or system, and the method for making an electrode for energy storage devices or systems. The types of energy storage devices that can incorporate such an electrode include ultracapacitors, lithium ion capacitors, batteries, fuel cells and hybrid cells which are the combination of the above devices. The types of energy storage systems that can incorporate such an electrode are the energy storage systems that use at least one of the above devices.

BACKGROUND OF THE INVENTION

Although different types of energy storage devices are made by different electrodes, electrolytes and other materials, thus with different energy storage mechanisms, the basic constitutions and the fundamentals of the devices are more or less the same. One example is that every type of energy storage device, including ultracapacitors, lithium ion capacitors, batteries, and fuel cells and hybrid cells which are the combination of the above devices, need electrodes. Another example is that, in all of these devices, if an electrode is made thicker, it will store more energy but with less power. Another example is that, among all the critical components, the electrode is one of the most important components in the energy storage devices. It plays a major role in determining the performance, the reliability or the field life, as well as the cost of the devices.

Energy density and power density are the most important performance characteristics for energy storage devices. In order to have high energy densities, electrodes need to be made with the highest amount of active materials per surface area or per volume. In the example of an ultracapacitor electrode, the more activated carbon is packed in the electrode, the higher capacitance the device will have, the higher energy density the device will provide. Therefore, a higher density electrode, i.e., with more active materials, is preferred. A higher density electrode also promotes more direct contact and a greater number of contacts between the active material particles, the conductive material and active material particles, thus promoting the potential for greater electrical passes inside the electrode, and thereby improving the electrical conductivity and the power density of the electrode. On the other hand, non-functional materials, such as binders and conductive carbon, do not add any capacitance or the energy to the electrode, thus should be used as minimally as possible. Due to the non-conductive nature of a binder, excessive usage of binders in the electrode will cause high electrical resistance in the device, thus lower the power density. Therefore, improving electrode packing density and reducing the non-functional material usage, are the most important ways to improve energy and power density of the electrodes.

Ultracapacitors store electrostatic energy in an electrode/electrolyte interface layer. At the electrode and electrolyte interface, a layer of ions is formed to balance the electrical charge on the electrode. The charge and discharge process is a pure physical process, there is no chemical reaction associated with the process and more importantly, to alter or degrade the materials. Therefore, the life of the devices in the applications is theoretically to be forever. However, in reality, there are always some undesired impurities in the device that cause chemical reactions during application, thus harming the device reliability and shortening the field life. The typical impurity in an Ultracapacitor is residue solvent in the electrode, or the impurities in the raw materials, especially in the activated carbon due to the excellent absorbing ability of the activated carbon.

Cost of an electrode is determined by the combination of the cost of the materials and the cost of manufacture. Less usage and cheaper raw materials, fewer manufacturing steps, less energy used in the manufacture process, high production through put and a higher yield of the manufacture are the main means to achieve a low cost energy storage product.

To make an electrode by a coating process, a solvent or an aqueous solution or both are used to dissolve binders, followed by mixing the binder solutions with other powder materials to form a slurry. The most widely used solvent in the battery, lithium ion capacitor, Ultracapacitor and hybrid cell electrode manufacture process is N-methylpyrrolidine, also known as NMP. The typical percentage of solids in the slurry is 15-20%. And the typical binder content in the total powder content is 3-6% and/or up to 15% to get the strong electrodes. The slurry is then coated onto a treated or non-treated current collector by a cylindrical roller. The current collector along with the coating layer is passed through a long dryer, where the solvent is dried and removed from the electrode.

The problems associated with the coated electrodes are: Problem #1—since the binder is dissolved in a solution and it flows into active materials to block the active material surfaces, this reduces the active materials functionality and also increases the device's overall resistivity, thus resulting in reduced device energy and power density; and Problem #2—there is always a residue from the solvent in the coated electrode due to large amount of solvent soaked in the electrode materials during the manufacturing process. Solvent such as NMP is very difficult to dry and remove. Therefore, an electrode made by a conventional coating method does not provide a long life energy storage device.

Other related problems include: Problem #3—solvent added to the electrode formulation needs to be removed. And, there is large amount of energy needed to dry and remove the solvent, which adds an additional cost to the manufacture of the product.

Finally, yet another problem that exists is: Problem #4—since the binder used is dissolvable in solvents by nature, the binder will be dissolved into the electrolyte chemically or electrochemically sooner or later, the particles in the electrode eventually lose contact to each other or to the current collector, and this inevitably leads to early energy storage device failure.

To make an electrode by an extrusion process, a solvent, normally with high lubricating quality, is added to a powder mixture, followed by an extensive mixing using a screw extruder or some other extruder. During the mixing and forward pushing process, large shear force is applied to the powder mixture, where the binder is fibrilized and acts to connect the other particles together. The typical percentage range of solids in the extrusion electrode formulation is 40%-60%. And the typical binder content in the total powder content is 10-15%. The extruder forced well mixed materials out from the exit and an electrode film is formed by a calendar or multiple calendar stations to the required thickness. The film passes through a long dryer to dry and remove the solvent.

The extrusion process for making an electrode does not have problems #1 where the binder flows into active materials to block the active material surfaces as much, and Problem #4 where binder will be dissolved into the electrolyte chemically or electrochemically sooner or later, as listed and outlined above in coating process, but maintains the problems associated with Problem #2 where there is always a residue from the solvent, since the lubricating solvents are normally very difficult to be dried out, and Problem #3 that a large amount of energy is needed to dry out the added solvent. In addition, new problems occur in the extrusion process. Problem #5 a high capital investment is required. The extrusion equipment along with the calendars followed by long dry ovens all are very expensive investments and the manufacture process is very complicated, therefore, the overall cost to make an extruded electrode is very high.

Another new problem, problem #6, that is, a higher percentage of the binder has to be used to make a strong enough electrode film which associates two new problems: Problem 6A—less active materials can be added to the electrode formulation, thus lower energy density of the device; and Problem 6B—this larger amount of binder blocks the surface area of the active materials, further lower the energy density of the device, and Problem 6C—this larger amount of binder blocks the electrical flow between the active material particles, thus increased resistance and reduced power density for the device.

To make an electrode by a dry process, powders were dry mixed and subjected to an extensive mixing, where the binder is fibrilized and is formed into a matrix to support the other particles to form an electrode film. The dry process solved all four problems associated with the coating process, and the problem #5 in the extrusion process however, it carried over extrusion process's problem #6, which is it needs a large quantity of the binder to support and to make a strong enough electrode film with adequate film density. The exact reason why it needs large amount of binder in the formulation is unknown. However, it is believed by the current inventor that the binder used in the dry process without activation by mixing with certain solvent provides less adhesion and therefore is less effective.

In this respect, before explaining at least one embodiment of the invention in detail it is to be understood that the invention is not limited in its application to the details of construction and to the arrangement of the components set forth in the following description or illustrated in the drawings. The invention is capable of other embodiments and of being practiced and carried out in various ways. In addition, it is to be understood that the phraseology and terminology employed herein are for the purpose of description and should not be regarded as limiting.

SUMMARY OF THE INVENTION

The principle advantage of this invention is that the resulting energy storage devices have a significant performance advantage over the prior art electrodes.

Another advantage of this invention is it results in energy storage devices with high energy, because a higher packing density electrode is formed and/or minimum amount of binder is used, and the greatest amount of active material can be incorporated.

Another advantage of this invention is as a result of the inventive process the binder is blocking the active material surface area much less, which also acts to increase the energy storage capability significantly.

Another advantage of this invention is that the expected increase/improvement of the energy output of an energy storage device made with the process of this invention over the prior art extrusion and dry process is greater than 10%.

Another advantage of this invention is that the expected increase/improvement of the energy output of an energy storage device made with the process of this invention over the prior art coating method is greater than 25%.

A further advantage of this invention is that the process results in energy storage devices with significantly higher power because less binder is used which significantly reduces the blocking of electrical flow between the particles.

Yet another advantage of this invention is that the process also promotes the direct and more contacts between the active material particles or the conductive material and active material particles due to higher packing density, thus promoting the potential for greater electrical passes inside the electrode.

Another advantage of this invention is that the ESR of the energy storage devices is greatly reduced, wherein the expected improvement of the power output of this invention compared to prior art processes are: to extrusion and dry process it is larger than 20%; and to the prior art coating method it is larger than 30%.

And yet another advantage of this invention is the resulting energy storage devices have significantly longer life, since the solvent used in the process is a minimal amount (especially if the first alternate embodiment example process is used), and also the solvent selected is highly vaporizable, the residue solvent in the electrode is minimal to non-existent, especially if/when the electrode is subject to a vacuum heating in the device manufacture process which is widely used in the energy storage industry.

A further advantage of this invention is the much more rapid drying process compared to prior art coating and extrusion processes, where the solvent is not highly vaporizable and is not easily dried, which also results in the life and performance of an electrode made using the present method much higher.

And another advantage of this invention is the process results in lower manufacturing costs, since there is no need to heat dry and remove the solvent, the cost of the current inventive process for electrode manufacture is low compared to the prior art methods of coating and extrusion. Less binder is used in this invention comparing to the dry method, which also reduces the electrode cost.

Therefore, in summary, the present invention provides a more efficient manufacturing method of making high performance, high reliability/long field life and cost effective electrodes for energy storage devices. The current invention uses a flexible binder. The binder is activated by certain additives and is uniformly deposited on to active and conductive material particles by high speed mixing. The particles deposited on the activated carbon are then pressed together along with activated particles to form free standing electrode film. High performance and cost effective products, such as free standing electrode films, laminated electrodes, ultracapacitors, lithium ion capacitors, batteries, fuel cells, and hybrid cells, which are the combination of the above devices, and energy storage systems that uses at least one of the above devices can be manufactured.

While the process methods can vary, one example of the process steps of the present invention include the following, wherein all percentages below equal a weight percent:

Step 1:

Powder mixing: mixing all the powder materials together, including active materials, conductive material additives, and the binder. The working ranges for each include 70-97% for the active materials, 0-10% for the conductive material additives, and 2-20% binder material. The optimal ranges include 88-96% for the active materials, 0-2% for the conductive material additives and 4-12% for the binder material.

Step 2:

Binder activation and deposition: add solvent to the powder mixture and slowly mix the solvent with the powder mixture. The working range for solvent added includes 10-50% solvent. The optimal range for solvent added is 20-40%. This is followed by the binder deposition on to active and conductive material which results from high speed mixing of all the added materials.

Step 3:

Film making: Press the mixed materials into a sheet or a free standing film.

Step 4:

Laminating the sheet or film on to a treated/or non-treated current collector to form the electrode.

With respect to an alternate embodiment of the present invention, a first alternate example of the process steps are the following, wherein all percentages below equal a weight percent:

Step 1:

Binder activation: Slow mixing binder with the solvent at a binder to solvent ratio of 1:1 to 1:4

Step 2:

Binder deposition: Mixing all the powder materials together, including active materials, conductive material additives, and the binder by a high speeding mixer. The working ranges for each include 70-97% for the active materials, 0-10% for the conductive material additives, and 2-20% binder material. The optimal ranges include 88-96% for the active materials, 0-2% for the conductive material additives and 4-12% for the binder material. All the current percentages are excluding the solvent amount.

Step 3:

Press the mixed materials into a sheet or a free standing film.

Step 4:

Laminating the sheet or film on to a treated/or non-treated current collector to form the electrode.

This first alternate example method is also a secondarily preferred process since the solvent consumption is held to a minimum, as the solvent is only added to the binder powder.

It must be clearly understood at this time although the preferred embodiment of the invention consists of a more efficient manufacturing method of making high performance, high reliability/long field life and cost effective electrodes for energy storage devices, many numerous configurations and combinations of materials can be used that will achieve the a similar operation and they will also be fully covered within the scope of this patent.

With respect to the above description then, it is to be realized that the optimum physical and chemical relationships for the parts of the invention, to include variations in size, materials, shape, form, chemistry, function and manner of operation, assembly and use, are deemed readily apparent and obvious to one skilled in the art, and all equivalent relationships to those illustrated in the drawings and described in the specification are intended to be encompassed by the present invention. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The accompanying drawings, which are incorporated in and form a part of this specification, illustrate embodiments of the invention and together with the description, serve to explain the principles of this invention.

DETAILED DESCRIPTION OF THE PREFERRED EMBODIMENTS

Figure 1:
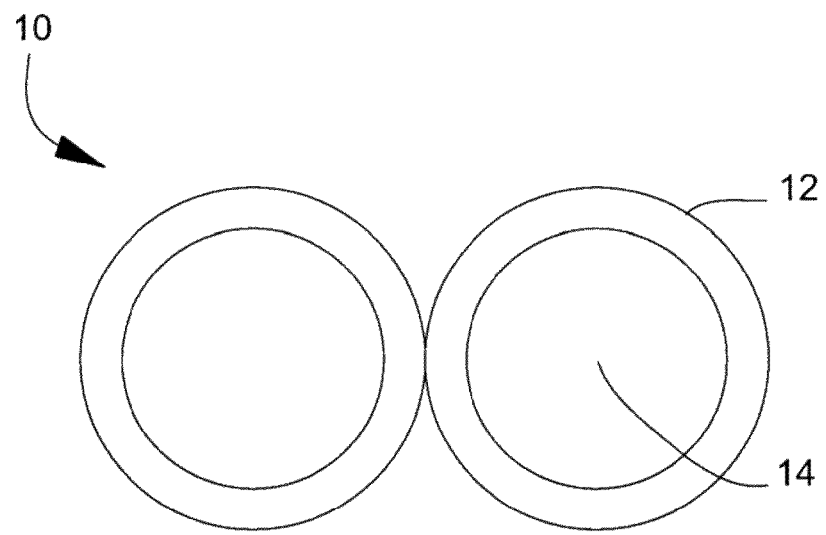
FIG. 1 depicts the structure of a prior art electrode made using the conventional coating process and illustrating the relationship between the active material particles and the binder layer.

For a fuller understanding of the nature and objects of the invention, reference should be made to the following detailed description taken in conjunction with the accompanying drawings wherein similar parts of the invention are identified by like reference numerals.

Referring now to the drawing figures, there is seen in FIG. 1 an illustration of the structure of a prior art electrode made using the conventional coating process and illustrating the relationship between the active material particles and the binder layer. Here is shown the relationships between the prior art electrode structure made by coating process 10, the binder layer 12, which acts as an insulation layer, and the active material particle 14.

Figure 2:
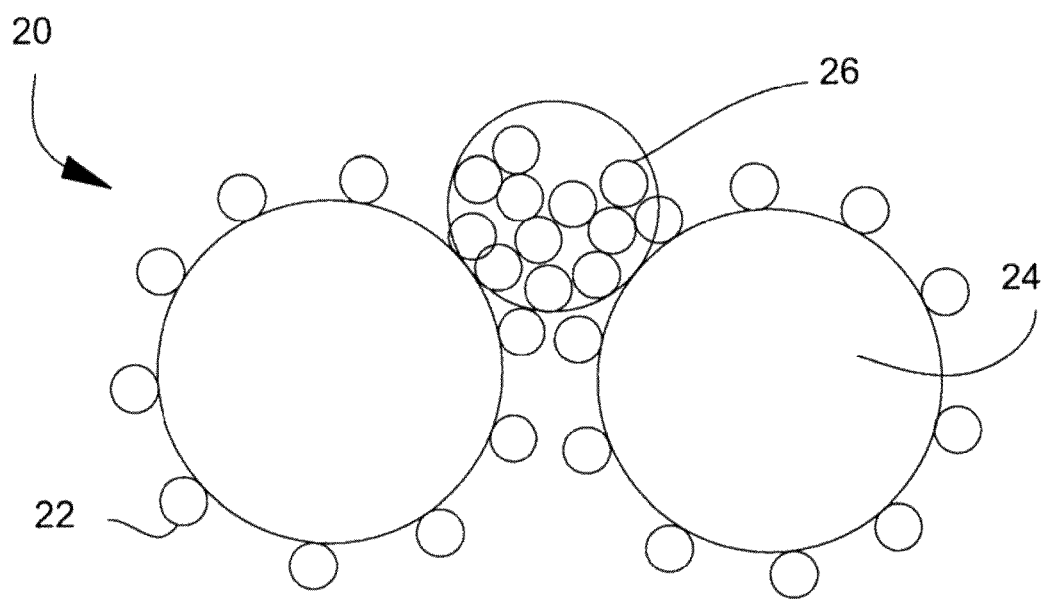
FIG. 2 depicts the structure of a prior art electrode made using the conventional extrusion process and illustrating the relationship between the active material particles and the binder particles.

FIG. 2 depicts the structure of a prior art electrode made using the conventional extrusion process and illustrating the relationship between the active material particles and the binder particles. Here is shown the relationships between the prior art electrode structure made by extrusion process 20, the binder particles 22, the active material particles 24, and more clearly detailing the clustered and wasted binder occupying extra space 26.

Figure 3:
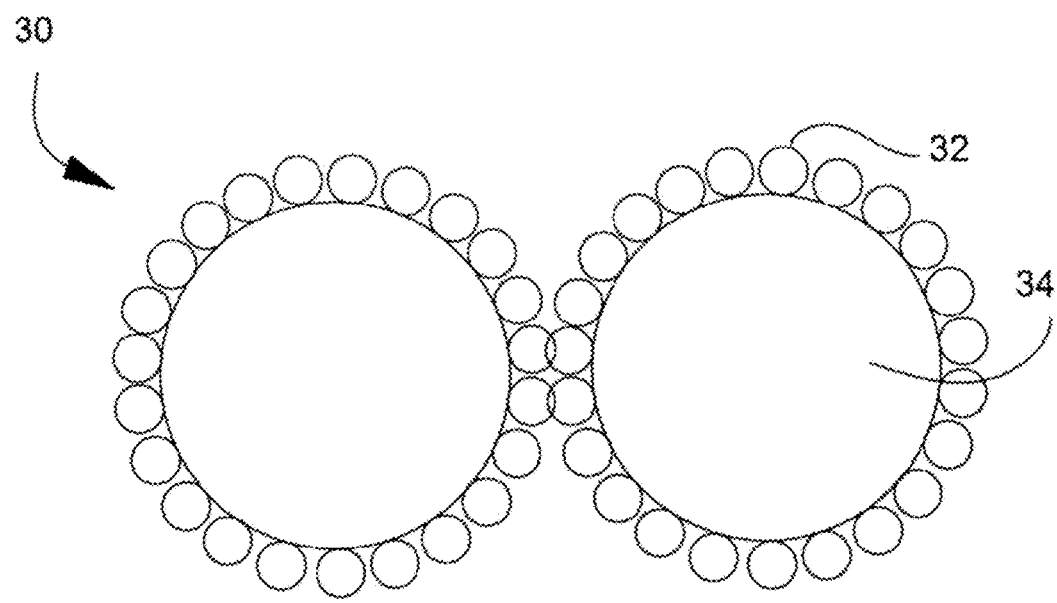
FIG. 3 depicts the structure of a prior art electrode made using the conventional dry process and illustrating the relationship between the active material particles and the binder particles.

FIG. 3 depicts the structure of a prior art electrode made using the conventional dry process and illustrating the relationship between the active material particles and the binder particles. Here is shown the relationships between the prior art electrode structure made by dry process 30, the binder particles 32, showing how extra binder particles are necessarily needed due to lower adhesion to the active material particles 34.

Figure 4:
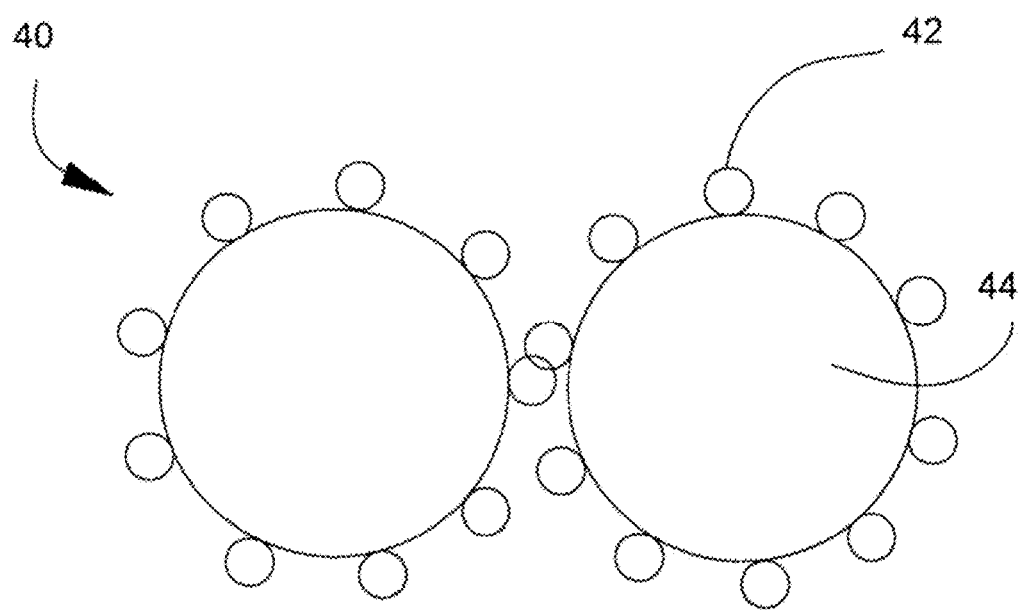
FIG. 4 depicts the structure of an electrode made using the present inventive method and illustrating the relationship between the active material particles and the binder particles, according to the present invention.

FIG. 4 depicts the structure of an electrode made using the present inventive method and illustrating the relationship between the active material particles and the binder particles, according to the present invention. Here is shown the relationships between the electrode structure made by the present inventive process 40, the binder particles 42, wherein fewer binder particles are needed due to higher adhesion to the active material particles 44, showing a much greater exposed working surface area.

The active material could be any active materials commonly used for electrodes in ultracapacitors, Lithium ion capacitors, batteries, fuel cell and hybrid cells, which are the combination of the above devices, such as activated carbon for ultracapacitors electrodes, manganese dioxide or other metal oxide for ultracapacitor or battery electrodes, intercalated carbon, hard carbon or activated carbon for Li-ion capacitor or Li-ion batteries and many other like materials.

The conductive carbon may be graphite, the carbon black, hard carbon or low level activated carbon, and metal particles.

The meaning of a flexible binder is that the binder can be formed into a sheet or a film materials subject a press force only. One example of such binder is some fluoropolymer, such as Teflon, or PTFE. The binder is also activatable by mixing with certain solvent, such that the adhesion capability of the binder to other materials is improved.

The selected solvent needs to have the capability to activate the selected binder, so that the binder improves its adhesion strength upon interacting with the solvent. The solvent also needs to be highly vaporizable such that no follow on drying process is necessary to remove the solvent afterwards. Examples may be hydrocarbons, low boiling point solvents, acetates, alcohols, glycols, acetone, DMC, ethanol, methanol, DEC, etc.

Powder mixing can be done by any kind of mixing equipment for mixing powders. Examples may be roller tanks, different types of conventional blenders, kitchen mixers, conventional mixers for mixing cement materials, conventional mixers for mixing medical materials, etc.

Activation of the binder can be done by any kind of mixing equipment, preferably a slower speed mixer or by hand if the quantity is not too large. Since the solvent used are highly vaporizable, slower speed mixer will promote less vaporization and give enough time for the solvent to be interacted with the binder.

Deposition of the binder onto active materials particles can be done by using a high speed grinder, a high speed blender or a high speed mixer. A medical grade grinder is ideal for performing a batch binder deposition process. A food grinder used in breaking the dried beans is a good option. A Waring™ blender, or a jet mill either a horizontal or vertical type, can be used in this process. An industrial high speed mixer would be ideal for processing a large quantity of material.

Press of the particles can be done by a high pressure presser to make electrode sheets, or by roll mills or a calendar and followed by calendaring to make continuous films. Multiple calendaring processes can be used to adjust the final electrode film thickness.

Below is shown Table 1, an electrode formulation and performance comparison chart illustrating the differences between prior art electrode manufacture methods and the current invention.

TABLE 1

| | Binder to total powder % | Nagative impact of the Binder to the active materials | % solids in the solution | Solvent needed | Energy needed to dry out solvent | Residue solvent from dried electrode | Adhesion property | Summary |
|---|---|---|---|---|---|---|---|---|
| Coating | 3-6 | Block pores & surface area | 20-30 | Yes | Yes | Yes | Weak carbon to carbon particle cohesion | Low performance Short life High cost |
| Extrusion | 10-15 | Occupy too much space | 40-60 | Yes | Yes | Yes | Weak film to Al adhesion | Low performance Short life High cost |
| Dry process | 10-15 | Occupy too much space & Block surface area | 100 | No | No | No | Good cohesion & adhesion | Low performance Long life Low cost |
| Current Invention | 3-6 | Minimum to no | 60-95 | Yes | No | Minimum to no | Strong cohesion & adhesion | High performance Long life Low cost |

This Table 1 and the drawing figures represent a comparison of the interactions of the active materials and the binder between prior art electrode manufacture methods and the present invention for an electrode for energy storage device and method for making same.

Case Study I: Importance of the Binder Activation

Experiment descriptions: two groups of samples were mixed by using a Waring™ pro blender PBB25 at high speed level for 3 minutes. The base materials were 44 grams (g)

activated carbon and 6 g PTFE. Group 1 does not have any additives to activate the binder (dry method). Group 2 has 20 g of additives to activate the binder (according to the present invention), where A2 has 20 g of IPA, B2 has 20 g of ethanol, C2 has 20 g of acetone. After the mixing, the powders were pressed by a two roll mill at roll temperature of 120 degrees centigrade (C).

Figure 5:
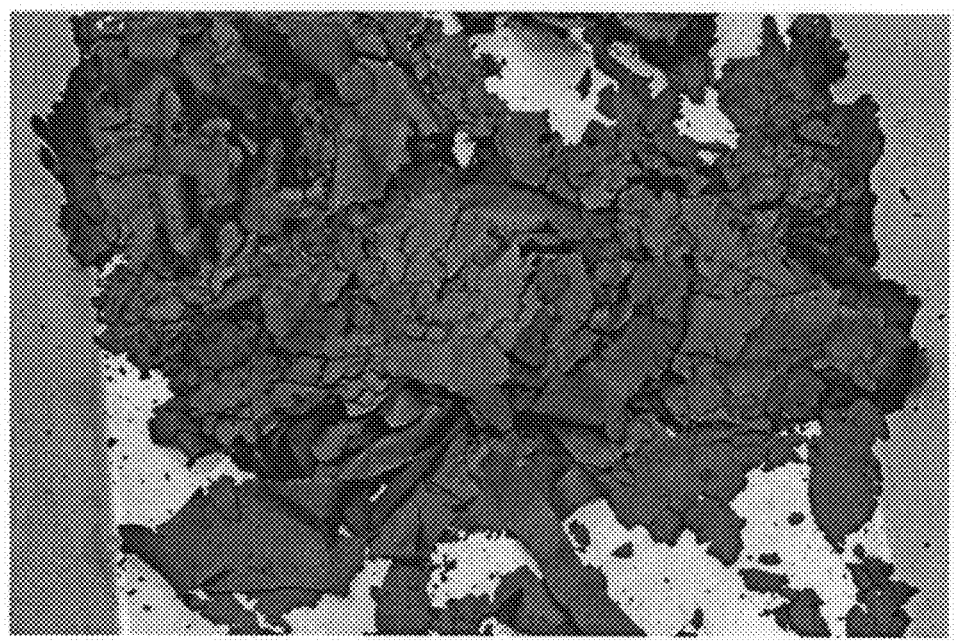
FIG. 5 depicts the appearance of small electrode film pieces made with the Group 1 sample, which is activated carbon plus binder without any additives.

Referring now to FIG. 5, there is shown how small electrode film pieces are formed and made with the Group 1 sample (activated carbon plus binder without any additives). The Group 1 sample became small electrode film pieces as show in FIG. 5, whereas, all the Group 2 samples became strong free standing electrode films, as shown and described in FIGS. 6 to 8 below. It is clearly seen that with or without binder activation by the solvents, the electrode film quality is significantly different. Without the binder activation, free standing film cannot be made by this process condition, however, with the binder activation, even at the same process conditions, good quality free standing electrode films are easily made.

Figure 6:
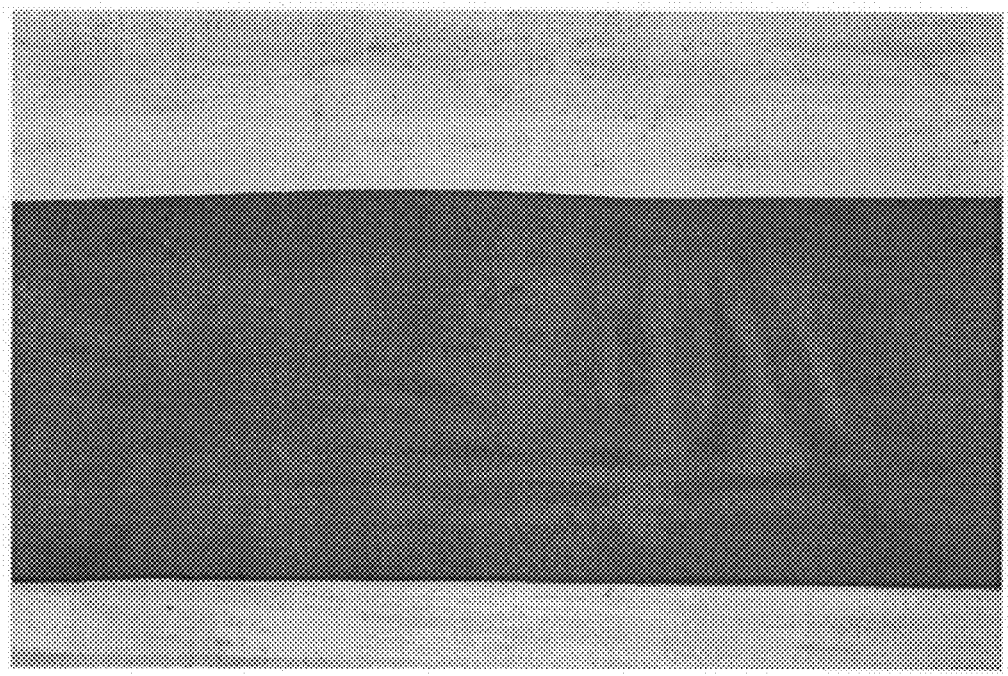
FIG. 6 depicts the appearance of an electrode film made with A2 of Group 2 sample, which is activated carbon plus binder plus IPA.

Referring now to FIG. 6, there is shown the appearance of an electrode film made with A2 of Group 2 sample, which is activated carbon plus binder plus IPA.

Figure 7:
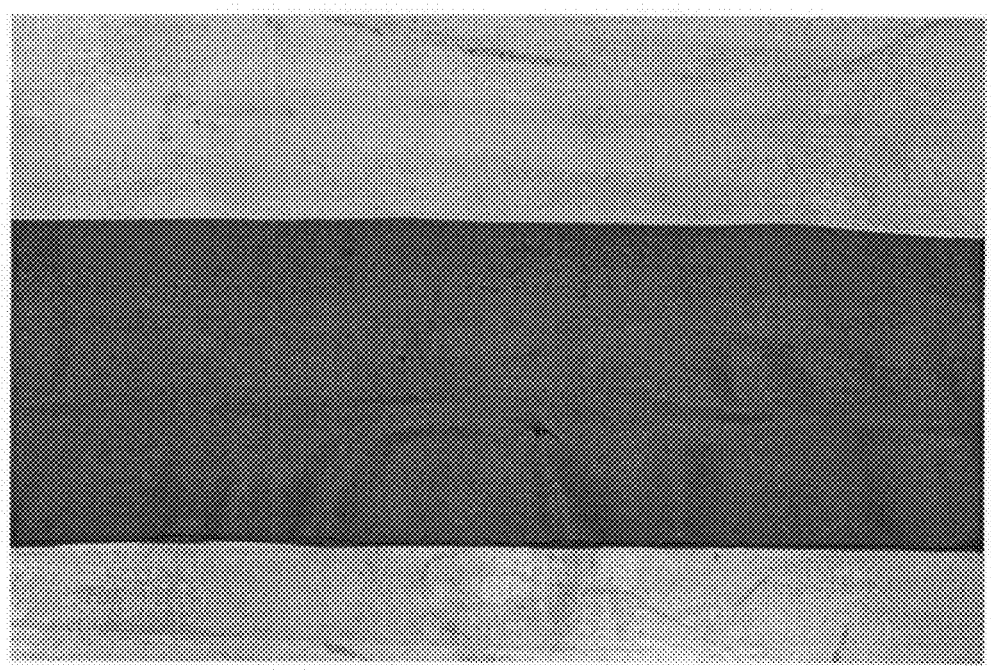
FIG. 7 depicts the appearance of an electrode film made with B2 of Group 2 sample, which is activated carbon plus binder plus ethanol.

Referring now to FIG. 7, there is shown the appearance of an electrode film made with B2 of Group 2 sample, which is activated carbon plus binder plus ethanol.

Figure 8:
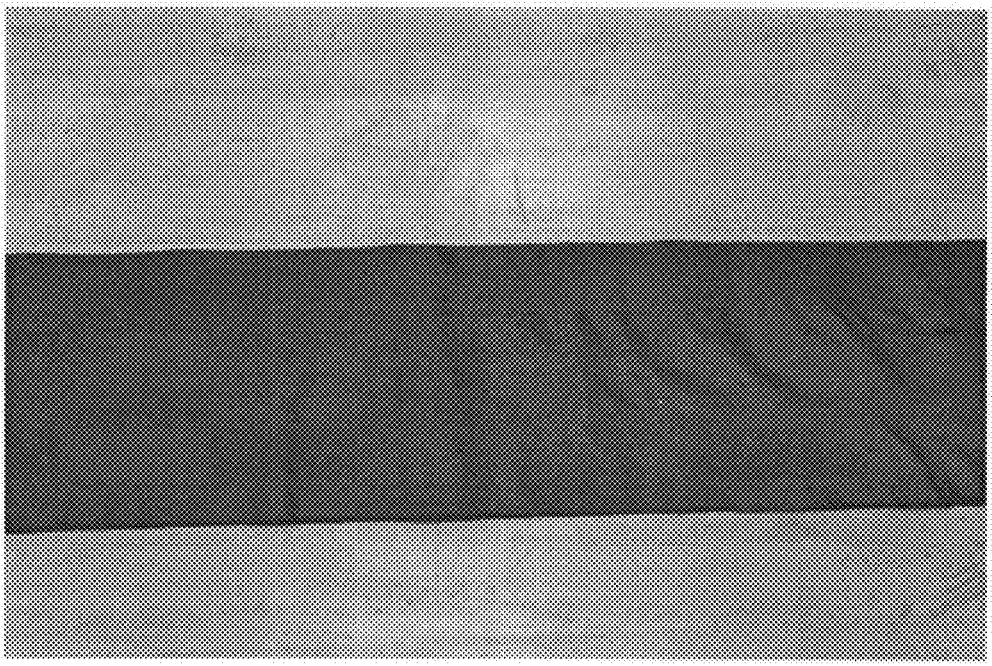
FIG. 8 depicts the appearance of an electrode film made with C2 of Group 2 sample, which is activated carbon plus binder plus acetone.

Referring now to FIG. 8, there is shown the appearance of an electrode film made with C2 of Group 2 sample, which is activated carbon plus binder plus acetone.

Case Study II: Comparison of Electrodes Made by Different Manufacture Methods

Electrodes were made by different manufacture methods, coating method, dry method and the current invention. The electrode characteristics and the performance were compared.

Experiment descriptions: to increase the mixing speed for dry method and the current invention, a Waring™ Commercial Heavy Duty 4 Liter Blender was used to mix the powders. Two groups of samples were mixed at speed level of 20,800 RPM for 6 minutes. The base materials were activated carbon and PTFE. Group 1 does not have any additives to activate the binder (dry method). Group 2 has additives to activate the binder (current invention). After the mixing, the powders were pressed by a two roll mill at roll temperature of 120 C.

The resulted electrode films were laminated on to coated Al foil by the roll mill at 190 C. The binder level in the electrode film changes from 4% to 12%. By using the dry method, films were not formed when the binder level in the powder mixture is below 8%. As a matter of fact, making a non-broken film is already impossible and the film is too fragile to be handled without broken into small piece when the binder level is 8% (as shown below in FIG. 9).

It was found to be very difficult to perform the lamination step to form the electrode from these electrode film pieces. However, when using the current invention, binder level in the powder mixture, excluding the solvent amount, can be reduced all the way to 4%, yet the film is still strong enough (as shown below in FIG. 10) to make a good quality electrode by the follow on lamination process.

Figure 9:
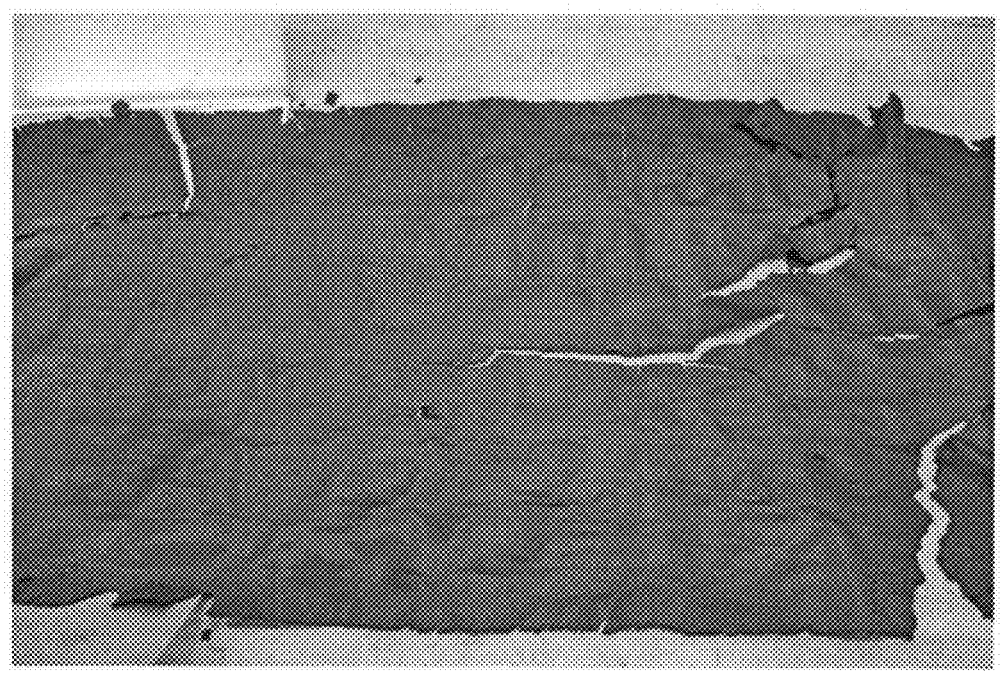
FIG. 9 depicts the appearance of an electrode film made with 4% PTFE binder (a B1 sample) by the dry process, showing the broken and fragile resulting electrode film.

FIG. 9 depicts the appearance of an electrode film made with 8% PTFE binder (a B1 sample) by the dry process, showing the broken and fragile resulting electrode film.

Figure 10:
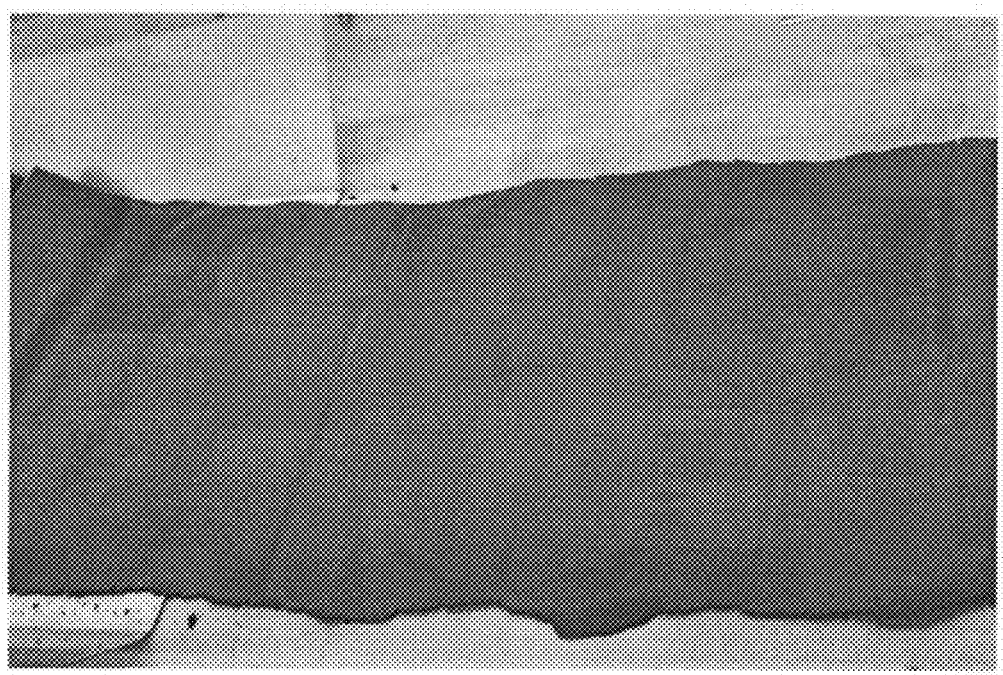
FIG. 10 depicts the appearance of an electrode film made with 4% PTFE binder (a D2 sample) made by the process of the present invention, showing a strong and continuous electrode film.

FIG. 10 depicts the appearance of an electrode film made with 4% PTFE binder (a D2 sample) made by the process of the present invention, showing a strong and continuous electrode film.

The Group 3 sample was made by a coating method. Activated carbon and carbon black were mixed together by a slow speed mixer. NMP solvent was used to dissolve PVDF binder by a slow speed mixer, and the resulted solution was added and mixed with the carbon mixture. The slurry was coated on to Al foil, the sample was dried, then pressed by a high pressure presser at 100 C. High level of PVDF binder were used, only to get a good quality electrode where the carbon particles are not broken off from the electrode easily as most of the commercial available coated electrode does.

The electrode formulations and the resulted electrode film and/or electrode quality are illustrated in Table 2 below.

TABLE 2

| | | Activated carbon (g) | PTFE (g) | % PTFE | Acetone (g) | Film quality |
|---|---|---|---|---|---|---|
| Dry method | A1 | 44 | 6 | 12 | 0 | Strong film |
| | B1 | 46 | 4 | 8 | 0 | Broken piece |
| | C1 | 47 | 3 | 6 | 0 | No film formed |
| | D1 | 48 | 2 | 4 | 0 | No film formed |
| Current invention | A2 | 44 | 6 | 12 | 20 | Very strong film |
| | B2 | 46 | 4 | 8 | 20 | Strong film |
| | C2 | 47 | 3 | 6 | 20 | Strong film |
| | D2 | 48 | 2 | 4 | 20 | OK film |

| | | Activated carbon (g) | PTFE (g) | % PTFE | NMP (g) | Electrode quality |
|---|---|---|---|---|---|---|
| Coating method | A3 | 44 | 6 | 12 | 215 | Good |
| | B3 | 44 | 5 | 10 | 215 | Carbon broken off |

I). Binder Activation Makes High Density Electrodes

Figure 11:
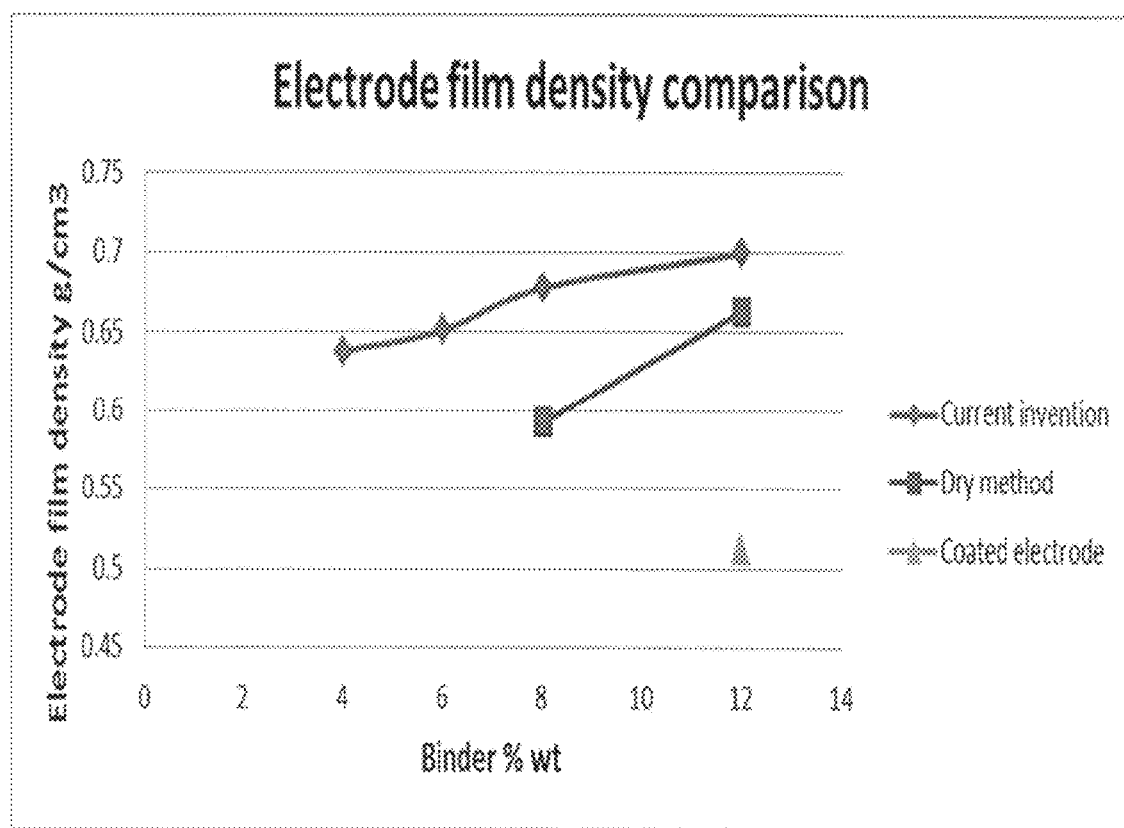
FIG. 11 depicts the graphical representation of the electrode film density comparison between different electrode manufacturing methods.

FIG. 11 depicts the graphical representation of the electrode film density comparison between different electrode manufacturing methods. As expected the coated electrode has the lowest electrode film density. Comparing between dry method and the current invention, not only films were not able to be made by the dry method when the binder level is below 8%, but also the film densities were much lower than that made by the current invention. The changing of the film density as changing of the binder level is also more dramatic for the dry method, which suggests the current invention an easier manufacture process and an easier process control.

Figure 12A:
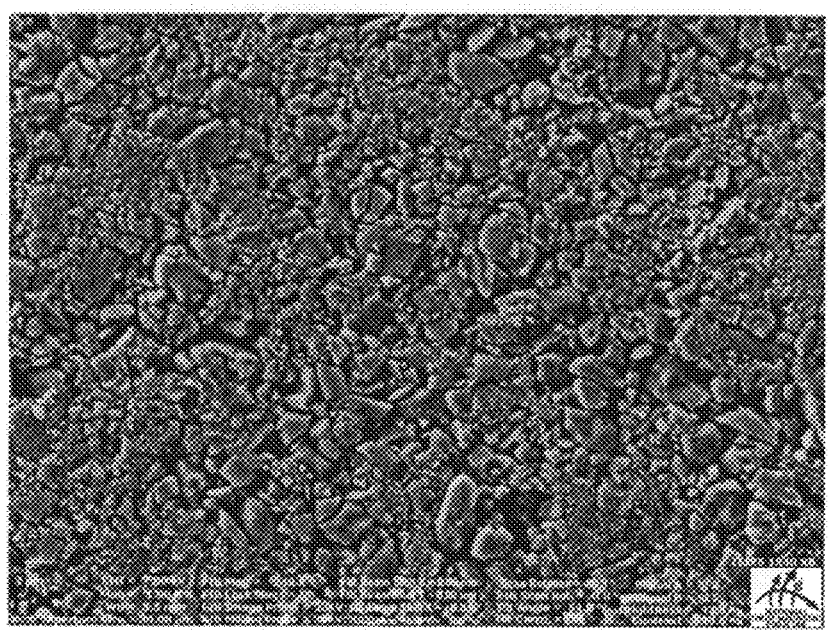
FIGS. 12A and 12B depict scanning electron micrograph images of a 12% PTFE electrode film made with the dry method, an A1 sample (FIG. 12A), and made according to the present invention an A2 sample (FIG. 12B), showing tighter packed particles in the A2 sample.
Figure 12B:
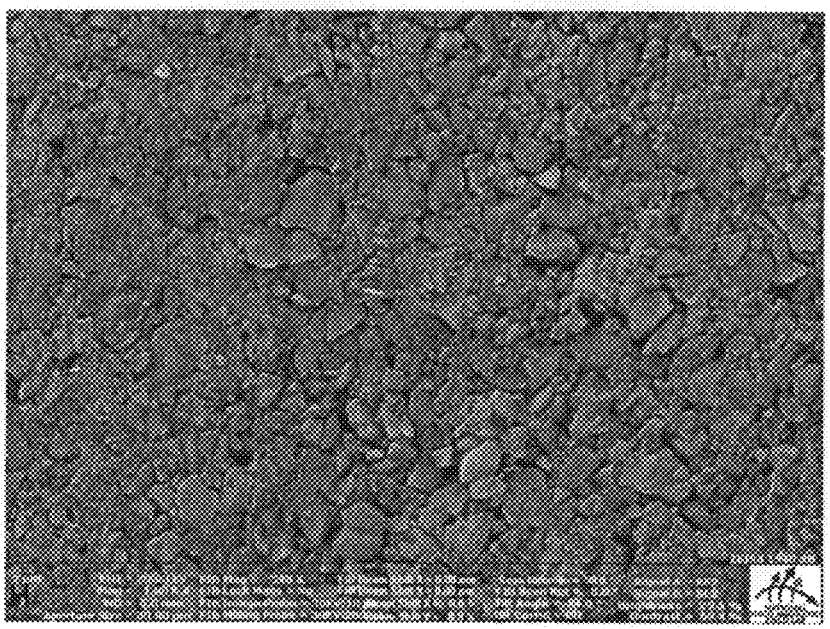

FIGS. 12A and 12B depict scanning electron micrograph images of a 12% PTFE electrode film made with the dry method, an A1 sample (FIG. 12A), and made according to the present invention an A2 sample (FIG. 12B). It is seen that the particles in the electrode are packed much tighter by current invention that those by dry method, which matches well with the density measurement results showing in FIG. 11.

Figure 13:
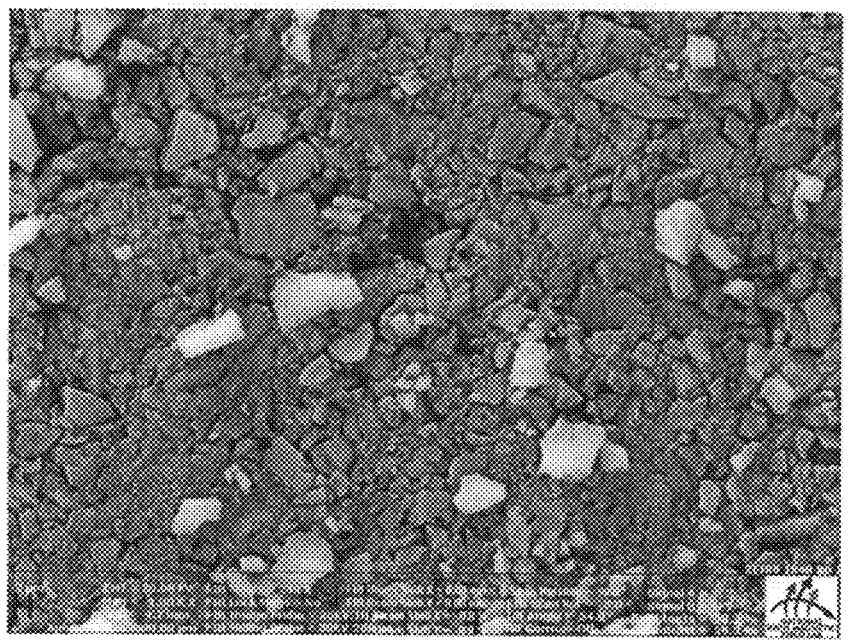
FIG. 13 depicts a scanning electron micrograph image of a 12% PTFE electrode film made with the dry method, a B1 sample, showing the loose particles on the electrode film surface.

FIG. 13 depicts a scanning electron micrograph image of a 8% PTFE electrode film made with the dry method, a B1 sample, showing the loose particles on the electrode film surface.

Figure 14:
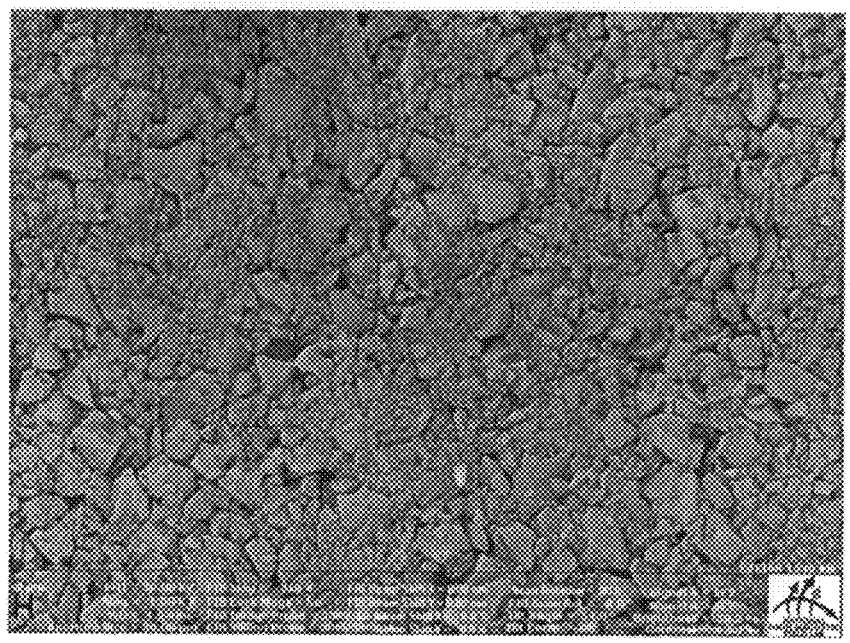
FIG. 14 depicts a scanning electron micrograph image of a 4% PTFE electrode film made according to the present invention, a D2 sample, showing the particles are packed well with no loose particles observed on the electrode film surface.

FIG. 14 depicts a scanning electron micrograph image of a 4% PTFE electrode film made according to the present invention, a D2 sample, showing the particles are packed well with no loose particles observed on the electrode film surface.

Some activated carbon particles from the 8% PTFE dry method sample broken off from the electrode film surface on B1 sample, as seen in FIG. 13 (white color particles as they are not as conductive due to the loose attachment) which suggests that the bonding force between the particles are not high enough to keep the electrode film integrity. However, even at 4% PTFE level, by the current invention, the particles are packed rather well, no loose particles are observed on the electrode surface, as shown in FIG. 14.

II). Less Activated Carbon Surface Area are Blocked from Current Invention Electrodes.

As stated earlier, high binder level will block activated carbon surface, thus reduce surface area of the activated carbon, thus reduce the capacitance of the electrode and also block the electrical passage between the particles. In this experiment, BET surface area of the activated carbon on the electrodes, excluding metal and binder and other materials, were measured and compared to that of the original activated carbon. Table 3 as shown below illustrates the BET surface area measurement of the activated carbon from different electrodes.

TABLE 3

|  | Activated carbon BET surface area ($m^2/g$) | Percentage of loss of activated carbon surface area due to binder blockage |
| --- | --- | --- |
| Raw activated carbon | 1650 |  |
| Coated electrode | 1124 | 32 |
| A1 (dry method, 12% PTFE) | 1176 | 29 |
| B1 (dry method, 8% PTFE) | 1377 | 17 |
| A2 (current invention, 12% PTFE) | 1285 | 22 |
| B2 (current invention, 8% PTFE) | 1397 | 15 |
| C2 (current invention, 6% PTFE) | 1429 | 13 |
| D2 (current invention, 4% PTFE) | 1452 | 12 |

Surface area of the original activated carbon before any process is 1650 m2/g. Surface area of the activated carbon from coated electrode with 12% binder is reduced from 1650 $m^2/g$ to 1124 $m^2/g$. 32% of the surface is blocked by the binder. Surface area of activated carbon from the dry method electrode with 12% binder is reduced from 1650 $m^2/g$ to 1176 $m^2/g$. 29% of the surface is blocked by the binder. Surface area of activated carbon from the current invention with the same 12% binder is reduced from 1650 $m^2/g$ to 1285 $m^2/g$. 22% of the surface is blocked by the binder. 7% better than the dry method and 10% better than coating method. Since the current invention makes low binder level electrode film possible, the surface area blockage is largely reduced, to only 12% when the binder level is 4%.

The data in Table 3 clearly shows: (1) the higher the binder level in the electrode, the more the surface area of the activated carbon is blocked by the binder; and (2) with same binder level, the coated electrode has the highest surface area reduction, followed by dry process, and the most optimal surface area is achieved by the current invention. The current invention makes a high quality electrode with a low usage of binder level possible. It not only reduces the binder blockage of the activated carbon surface area, but also reduces the electric flow blockage between the particles, which leads to a high capacitance and low ESR energy storage device.

III). Binder Activation Makes a High Performance Electrode and their Energy Storage Devices.

Small T cell Ultracapacitors were made by using different electrodes. Electrodes were cut into a circular shape with the area of 1 cm2. Electrode film thickness is 85 um+/−3 um, excluding other materials, such as Al foil and the bonding layer. Three cells were made for each group of electrodes. Capacitance and ESR were measured for each cell, and the average measurement was taken for each group.

Table 4 below shows the measurements of T cells made by electrodes from use of the current invention compared to a typical coated electrode.

TABLE 4

|  | ESR (ohm) | C (F) | RC (s) |
| --- | --- | --- | --- |
| A3 (coated electrode) | 3.728 | 0.276 | 1.030 |
| A2 | 2.268 | 0.305 | 0.692 |
| Improvement to A3% | 39 | 10 | 33 |
| B2 | 2.150 | 0.310 | 0.667 |
| Improvement to A3% | 42 | 12 | 35 |
| C2 | 1.779 | 0.322 | 0.558 |
| Improvement to A3% | 52 | 17 | 46 |
| D2 | 1.877 | 0.302 | 0.567 |
| Improvement to A3% | 50 | 9 | 45 |

It is seen that the ESR improvement from best sample of current invention to a coated electrode is as high as 52% and capacitance improvement is as high as 17%. RC constant is reduced from 1 second to 0.56 seconds.

Table 5 illustrates the measurement results and comparative data of electrodes constructed according to the current invention compared to the most optimal electrode made by dry process. It is seen that the ESR improvement from best sample of current invention to the best sample of dry processed electrode is as high as 29% and capacitance improvement is as high as 12%. RC constant is reduced from 0.73 seconds to 0.56 seconds.

TABLE 5

|  | ESR (ohm) | C (F) | RC (s) |
| --- | --- | --- | --- |
| A1 (dry method) | 2.517 | 0.288 | 0.726 |
| A2 | 2.268 | 0.305 | 0.692 |
| Improvement to A1% | 10 | 6 | 5 |
| B2 | 2.150 | 0.310 | 0.667 |
| Improvement to A1% | 15 | 8 | 8 |
| C2 | 1.779 | 0.322 | 0.558 |
| Improvement to A1% | 2925 | 12 | 23 |
| D2 | 1.877 | 0.302 | 0.567 |
| Improvement to A1% | 50 | 5 | 22 |

The electrode for energy storage devices and a method for making the electrode for energy storage devices shown in the drawings and described in detail herein disclosed arrangements of elements of particular construction and configuration for illustrating preferred embodiments of structure and method of operation of the present application. It is to be understood, however, that elements of different construction, chemistry, configuration and other arrangements thereof, other than those illustrated and described may be employed for providing an electrode for energy storage devices and a method for making the electrode for energy storage devices in accordance with the spirit of this disclosure, and such changes, alternations and modifications as would occur to those skilled in the art are considered to be within the scope of this design as broadly defined in the appended claims.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A method for making an electrode for an energy storage device without extrusion, the method comprising:
   forming a powder mixture by mixing powder materials comprising active material particles in a working range of about 70-97 weight percent, conductive material particles in a working range of about 0-10 weight percent, and binder material in a working range of about 4-8 weight percent;
   activating the binder material by:
   (i) adding and mixing solvent to the powder mixture, including a working solids range of about 83-96 weight percent; and
   (ii) mixing by high speed mixer all of the mixed materials from (i);
   forming a film without extruding the mixed materials by pressing the mixed materials into a free standing film without performing a drying operation on the mixed materials before a next operation; and
   laminating the free standing film on to a non-treated current collector to form the electrode.

2. The method for making an electrode for an energy storage device according to claim 1, wherein said mixing all of the powder materials together includes mixing said active material particles in a working range of about 88-96 weight percent.

3. The method for making an electrode for an energy storage device according to claim 1, wherein said mixing all of the powder materials together includes mixing said conductive material particles in a working range of about 0-2 weight percent.

4. The method for making an electrode for an energy storage device according to claim 1, wherein said mixing all of the powder materials together includes mixing said binder material in a working range of about 4-6 weight percent.

5. The method for making an electrode for an energy storage device according to claim 1, wherein said laminating the free standing film includes laminating the free standing film on to a previously treated current collector to form the electrode.

6. The method for making an electrode for an energy storage device according to claim 1, wherein said electrode is used in an ultracapacitor.

7. The method for making an electrode for an energy storage device according to claim 1, wherein said electrode is used in a lithium-ion capacitor.

8. The method for making an electrode for an energy storage device according to claim 1, wherein said electrode is used in a battery.

9. The method for making an electrode for an energy storage device according to claim 1, wherein said electrode is used in a fuel cell.

10. The method for making an electrode for an energy storage device according to claim 1, wherein said electrode is used in a hybrid cell.

11. The method for making an electrode for an energy storage device according to claim 1, wherein said electrode is used in an energy storage system comprising system blocks and modules,
   wherein at least one of said energy storage system blocks and modules includes said electrode.

* * * * *